US 6,727,511 B2

(12) United States Patent
Cusick et al.

(10) Patent No.: US 6,727,511 B2
(45) Date of Patent: Apr. 27, 2004

(54) SENSOR ARRAY SYSTEM FOR OBJECT POSITION DETECTION

(75) Inventors: Richard T. Cusick, Laurel, MD (US); Robert F. Walsh, Tucson, AZ (US); Dennis K. Wickenden, Woodbine, MD (US)

(73) Assignee: The Johns Hopkins University, Baltimore, MD (US)

( * ) Notice: Subject to any disclaimer, the term of this patent is extended or adjusted under 35 U.S.C. 154(b) by 61 days.

(21) Appl. No.: 10/006,449

(22) Filed: Nov. 21, 2001

(65) Prior Publication Data

US 2002/0139942 A1 Oct. 3, 2002

Related U.S. Application Data

(60) Provisional application No. 60/252,503, filed on Nov. 22, 2000.

(51) Int. Cl.[7] .............................................. G01N 21/86
(52) U.S. Cl. ................... 250/559.29; 250/221
(58) Field of Search ..................... 250/559.29, 221, 250/559.4, 203.6; 340/426.24–426.26, 540, 541, 555–557, 539.22, 539.23, 545.3, 55

(56) References Cited

U.S. PATENT DOCUMENTS

| | | | | |
|---|---|---|---|---|
| 2,442,690 A | * | 6/1948 | Hoffman et al. | 250/221 |
| 5,196,689 A | * | 3/1993 | Sugita et al. | 250/221 |
| 5,784,156 A | * | 7/1998 | Nicholson | 356/141.5 |

* cited by examiner

Primary Examiner—Thanh X. Luu
(74) Attorney, Agent, or Firm—Albert J. Fasulo, II

(57) ABSTRACT

A sensor array system for detecting the position of an object or energy source. The system includes a plurality of sensors, each sensor having a limited field of view and being capable of detecting an object or energy source that is positioned within its field of view. The fields of view of at least some of the sensors overlap the fields of view of other sensors, and the overlapping fields of view define unique spatial regions. A data acquisition system is operatively connected to the plurality of sensors and is used to determine which sensors simultaneously detect an object or energy source, thereby determining the unique spatial region in which the object or energy source is located.

6 Claims, 5 Drawing Sheets

SENSOR ARRAY SYSTEM FOR OBJECT POSITION DETECTION

CROSS-REFERENCE TO RELATED APPLICATION

This application claims the benefit of prior filed U.S. Provisional Application No. 60/252,503, now abandoned filed on Nov. 22, 2000.

STATEMENT OF GOVERNMENT INTEREST

This invention was made with government support under contract N00039-95-C-0002 awarded by the Department of the Navy. The government has certain rights in the invention.

BACKGROUND OF THE INVENTION

1. Field of the Invention

The present invention relates generally to sensor arrays and particularly to linear and multi-dimensional sensor arrays for uniquely identifying spatial regions.

2. Description of the Related Art

Advances in microelectronics and electro-optics have made a wide variety of low-cost energy-detection sensors commercially available. Examples of devices that contain such sensors include Infrared (IR) and microwave motion sensors, fiber optic light sensors, charged coupled display (CCD) cameras, and laser radar (LIDAR) devices. These devices are used in various applications to detect objects, motion, or energy such as light or sound. However, in order to identify or track the position of an object or energy source, complicated systems with moving parts are often required involving, for example, gimbaled raster scanning apparatus. There is a need for less complex and more durable devices that employ no moving parts, and yet are capable of detecting the position or motion of objects or energy sources in both two and three-dimensional space.

SUMMARY OF THE INVENTION

The present invention is directed to a sensor array system for detecting the position of an object or energy source. The system includes a plurality of sensors, each sensor having a limited field of view and being capable of detecting an object or energy source that is positioned within its field of view. The fields of view of at least some of the sensors overlap the fields of view of other sensors, and the overlapping fields of view define unique spatial regions. A data acquisition system is operatively connected to the plurality of sensors and is used to determine which sensors simultaneously detect an object or energy source, thereby determining the unique spatial region in which the object or energy source is located.

DESCRIPTION OF THE PREFERRED EMBODIMENT(S)

Figure 1:
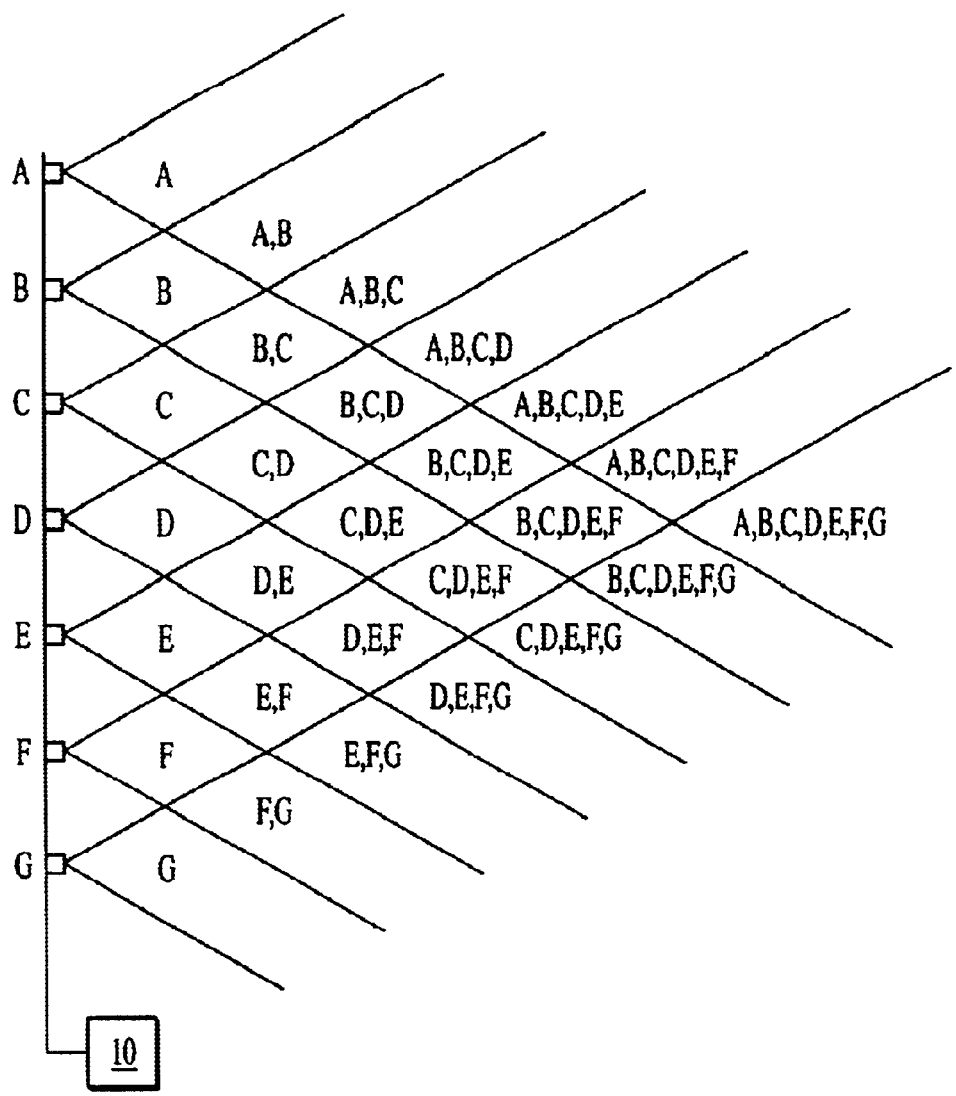
FIG. 1 is a schematic diagram of an embodiment of the present invention comprising a linear array of seven evenly spaced sensors A–G.

FIG. 1 illustrates an embodiment of the present invention comprising a linear array of seven evenly spaced sensors labeled A–G. In FIG. 1, each sensor points to the right of the page and has a limited field of view that is defined by two angular lines that originate at the sensor. The overlapping fields of view of the sensors create a series of diamond-shaped regions. In FIG. 1, each diamond-shaped region is labeled with the letter(s) of the sensor(s) that is capable of viewing that region. The first complete column of diamond-shaped regions falls within the field of view of only one sensor, the second column within the fields of view of a unique combination of two sensors, the third column within the fields of view of a unique combination of three sensors, etc. Therefore, by knowing which sensors simultaneously detect an object or energy source, one can identify the position of the object or energy source with a resolution equivalent to the area of a unique two-dimensional (2-D) region. The resolution can be improved by increasing the number of sensors that monitor a given spatial region.

A 2-D array of sensors can be used to create a three dimensional (3-D) position measurement system. As an example of such a 3-D system, two linear sensor arrays similar to the array A–G illustrated in FIG. 1 are placed orthogonal to each other. The 3-D fields of view of the sensors of such a 2-D array could define overlapping cone-shaped regions.

The sensors of the present invention can include simple optical sensors such as those described in the example below, or more sophisticated sensors such as radar or LIDAR transceivers. If there is a need to detect a particular type of object or energy source, the sensors can be tuned to detect specific desired wavelengths and to discriminate against other wavelengths.

The sensors are connected to a data acquisition system 10 used to collect data from the sensors and to determine which sensors are simultaneously triggered. That is, which sensors have simultaneously observed an object or energy source within their respective fields of view, thus defining the location of the object or energy source.

Applications of the present invention include "hit detectors" for detecting when and where a projectile strikes a target. A linear array of sensors according to the present invention can be used to create a "hit panel" that records projectile impacts, for example, at a firing range. One application involving a more complicated geometry is discussed in the detailed example described below. In the example, a hit detector array according to the present invention is placed around the body a cylindrical missile.

EXAMPLE

The present example concerns a hit detector according to the present invention that is capable of detecting when and where shrapnel from an intercepting kinetic warhead impacts a cylindrical motor section of a target test missile. An array of evenly spaced fiber optic light sensors is placed around the circumference of the target test missile. The sensors are designed to detect the intense flash of light, called the hit flash plume, that is known to occur when a target is impacted by a hypervelocity projectile.

Fiber optic cables connect all of the sensors to the data acquisition system 10 that is mounted elsewhere on the target test missile. The data acquisition system 10 is designed to record the precise time when each sensor is triggered and to telemeter that data to a ground or air-based test control station.

Figure 2:
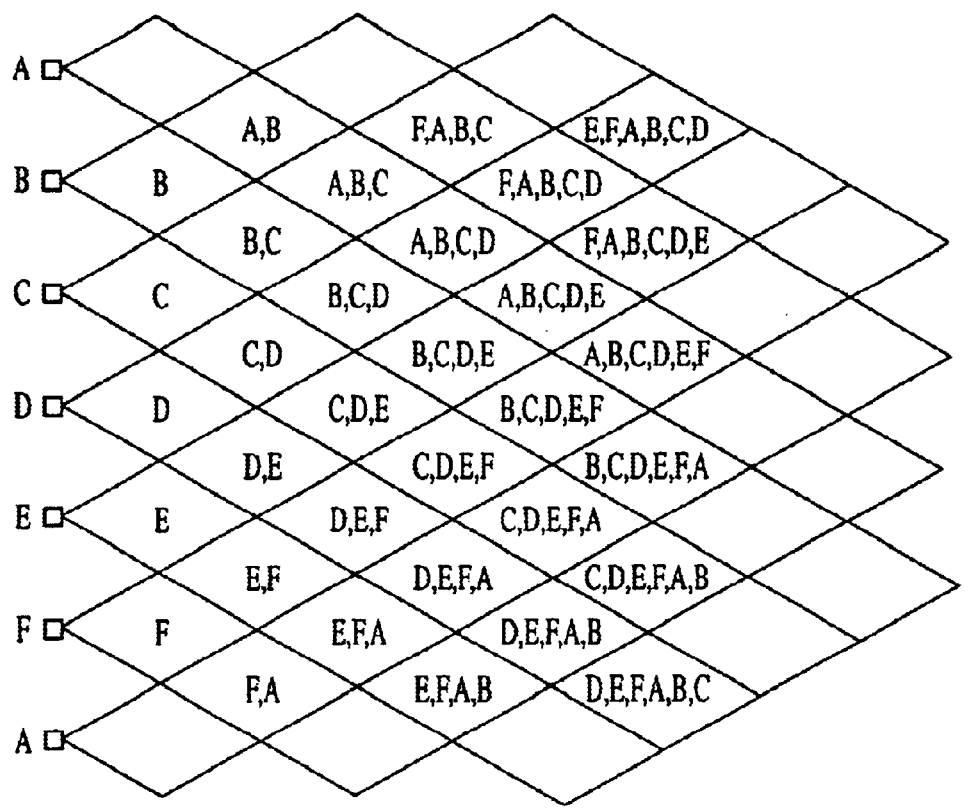
FIG. 2 is a linear illustration of a six-sensor circular array A–F, resulting in sensor A appearing at both ends of the linear illustration of the array.

The hit detector array according to the present example requires wrapping a linear array such as that shown in FIG. 1 around a cylinder to create a circular sensor array. FIG. 2 is a linear illustration of a six-sensor circular array A–F, resulting in sensor A appearing at both ends of the linear illustration of the array. Note from FIG. 2 that there are regions between each sensor and the first pair of intersecting lines that are not "seen" by any of the sensors. Also note that, given six sensors, it is not possible to resolve more than five columns of diamond-shaped regions.

Derived below are simplified calculations that may be used to determine: 1) the field of view of the sensors as a function of hit flash plume height; 2) the number of sensors required for a given resolution; 3) the effect of curvature of an array on predicted system performance; and 4) the effect of hit flash plume dimensions on resolution. While the calculations can be applied to any cylindrical geometry, the results are presented for a missile motor section with a radius of 22 in. and a length of approximately 144 in.

Figure 3:
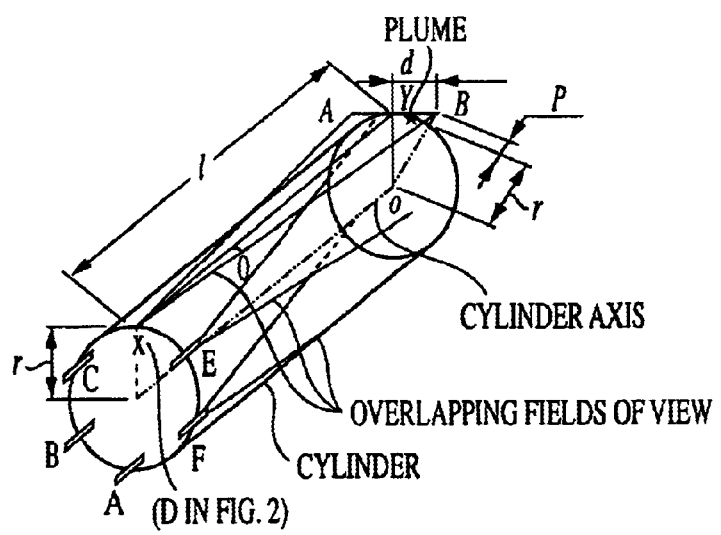
FIG. 3 is an illustration of a sensor according to the present invention on the surface of a cylinder, radius r, at X, having a half-angle field of view θ. The length of the sensor's planar field of view at distance l, AB, is a function of the height of a hit flash plume, p.

The calculations below are based on the geometry illustrated in FIG. 3. A sensor placed on the surface of a cylinder of radius r and length l at X has a planar field of view of half-angle ($\theta$) in the horizontal direction. The half-angle is determined as a function of the plume height p from $\Delta$OYB by the expression $$\theta = \tan^{-1}\left\{\frac{\sqrt{(r+p)^2 - r^2}}{l}\right\}. \tag{1}$$

Figure 4:
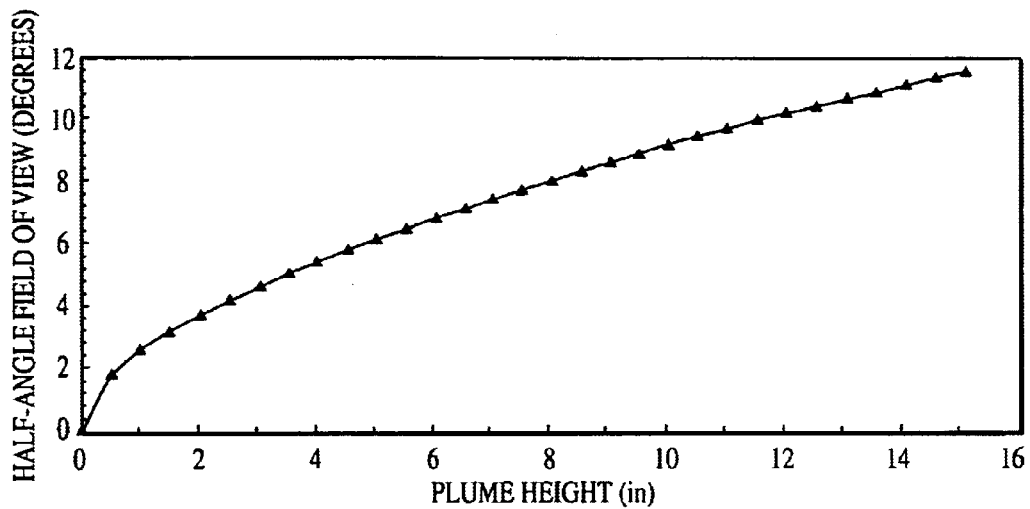
FIG. 4 is a plot showing the half-angle field of view of a sensor according to an embodiment of the present invention as a function of height of a hit flash plume situated 144 inches from the sensor.

The results for plume heights in the range 0 to 16 inches are shown graphically in FIG. 4. The half-angle field of view for plume heights of 4 and 8 in. at the furthest distance considered (144 in.) are 5.5° and 8.1°, respectively.

The half-angles are then used to determine the number of sensors (m) that need to be uniformly distributed around the circumference of the missile motor to achieve a desired resolution. In this context, the axial resolution is defined as the axial dimension of the diamond overlap pattern and the radial resolution is defined as the distance between sensors.

Figure 5:
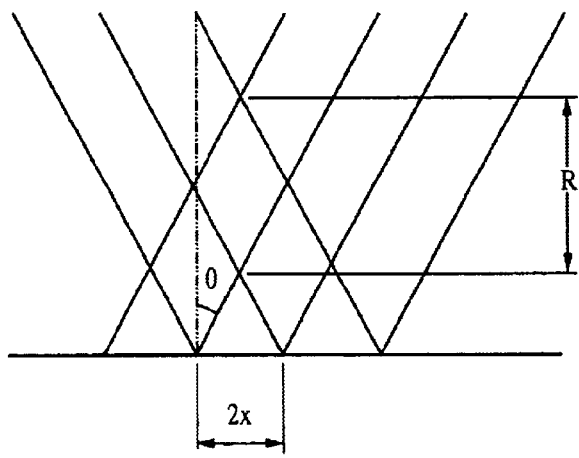
FIG. 5 is a schematic diagram illustrating how the axial resolution of a sensor according to an embodiment of the present invention is a function of its half-angle field of view and its separation from an adjacent sensor.

Referring to FIG. 5, and given that x=$\pi$r/m, the resolution is given by:

$$R = \frac{2\pi r}{m \tan\theta}. \tag{2}$$

Figure 6:
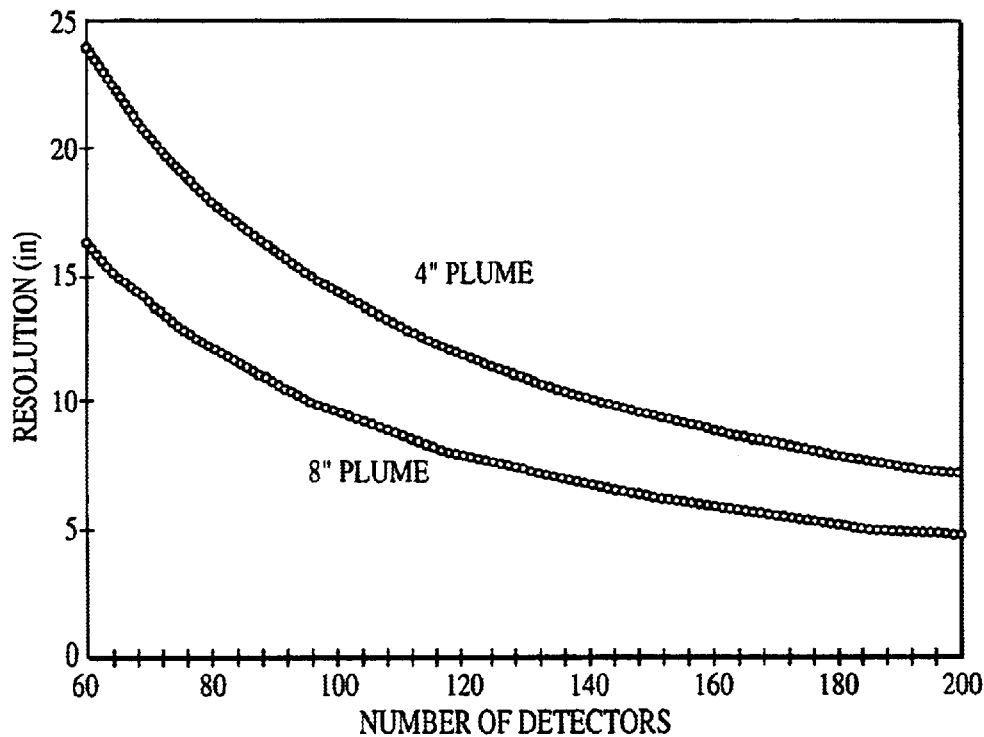
FIG. 6 is a plot showing the axial resolution of sensors according to an embodiment of the present invention as a function of the number of uniformly spaced sensors for 4- and 8-inch hit flash plume heights.

The results for 4- and 8-in. plumes, corresponding to half-angle fields of view of 5.5° and 8.1°, respectively, are given in FIG. 6. From these calculations it is concluded that for a 4 in. plume approximately 180 uniformly spaced sensors are required for an 8 in. axial resolution, and approximately 120 for a 12 in. axial resolution. For an 8 in. plume the number of uniformly spaced sensors for 8 in. and 12 in. axial resolution is 120 and 80, respectively. The radial resolution (2x) for 80, 120, and 180 sensors is 1.73 in., 1.15 in., and 0.77 in., respectively.

The resolution numbers derived above are applicable to a planar surface only. The effect of the curvature of the cylinder is calculated by projecting the lines XA and XB in FIG. 3 onto the cylinder's surface. The length of the resultant arc as a function of distance from the sensor (l) is given by:

$$\text{arc} = \tan^{-1}\left(\frac{l \cdot \tan\theta}{r}\right) \cdot r. \tag{3}$$

Figure 7:
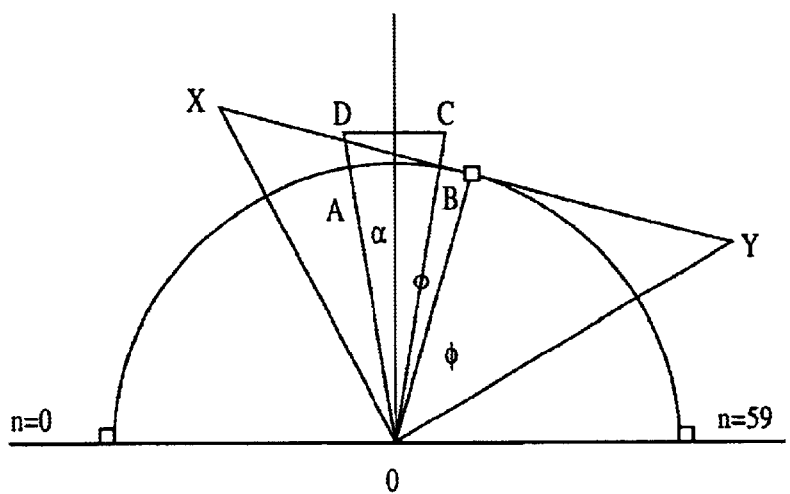
FIG. 7 is a schematic diagram illustrating how to calculate the effect of finite size of the hit flash plume according to an embodiment of the present invention.

The effect of the size of the hit flash plume may be determined as shown in FIG. 7. In this figure the box ABCD gives the area of the plume, with the plume width being AB and the plume height AD. The inclination of sensor n, $\omega$, is given by 360n/m, where m is the total number of sensors. If sensor n's planar field of view, XY, intercepts ABCD then that sensor records a 'hit'.

One problem with the simple sensor geometry shown in FIG. 2 is that axial resolution is lost if there is a finite plume width. As an example, it is impossible to discriminate a 16 in. wide plume at 40 in. from an 8 in. wide plume at 80 in., or a 0 in. wide plume at 130 in. from the sensors. This problem is overcome by placing another set of sensors with a limited field of view (e.g., 0°) between each of the wider field of view sensors. The response of the limited field of view sensors will give a direct measurement of the plume width. Thus, by taking into account the results from the two sets of sensors, the loss in axial resolution with finite plume widths is restored.

Figure 8:
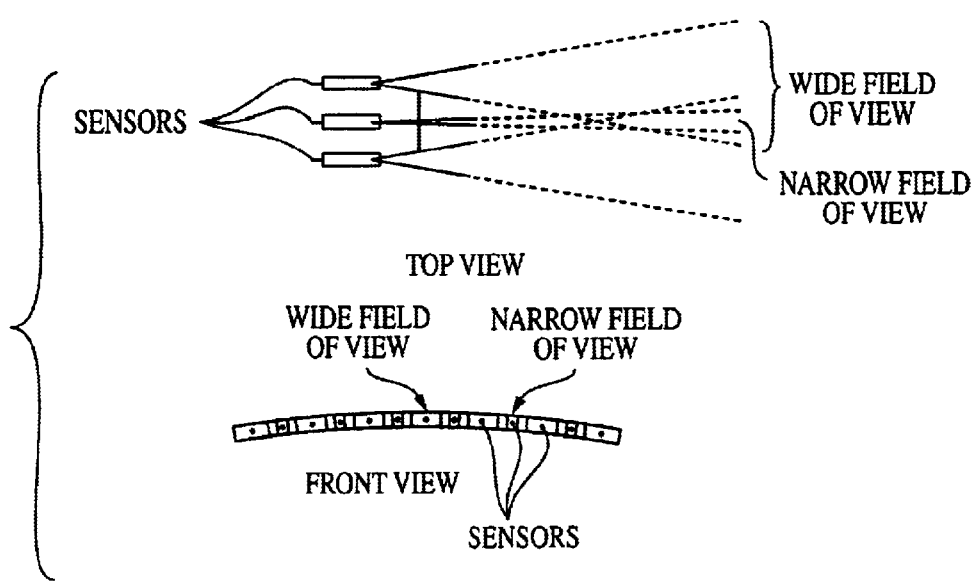
FIG. 8 is a schematic diagram illustrating two uniformly spaced arrays of sensors according to an embodiment of the present invention having different half-angle fields of view of 8.1° and 0°.

A basic layout of the two sets of sensor arrays is shown in FIG. 8. In this example, the hit flash intensity is assumed to be high enough that no collimating optics are required and that the light is collected at each sensor position by a fiber optic bundle with a nominal outside diameter of 0.1 in. The fields of view of the two sets of sensors are constrained by suitably machined baffles. The actual shape of the baffles for a specific application will depend on the type of fiber chosen, its core diameter and its numerical aperture.

The above example describes a specific application of the present invention. Various alterations, modifications, and improvements concerning this and other applications will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A sensor array system for detecting the position of an object or energy source, comprising:

a cylindrical object having a curved surface;

a plurality of sensors arranged around a circumference of the cylindrical object, each having a limited field of view that extends along a length of the curved surface such that each of the plurality of sensors is capable of detecting an object or energy source that is positioned within its field of view, wherein the fields of view of at least some of the sensors overlap the fields of view of other sensors, the overlapping fields of view defining unique spatial regions along the curved surface of the cylindrical object; and a data acquisition system, operatively connected to said plurality of sensors for determining which sensors simultaneously detect an object or energy source, thereby determining the unique spatial region, along the curved surface of the cylindrical object, in which the object or energy source is located, wherein the system is designed to function as a hit detector for detecting hit flash plume on said curved surface of said cylindrical object, and wherein, for at least one of the plurality of sensors:

said field of view extends along the length of the curved surface in a direction that is substantially perpendicular to a radius or curvature r of the cylindrical object, wherein l denotes the length of the curved surface;

said hit flash plume has a plume height p within said field of view; and said field of view has a half-angle θ in accordance with:

$$\theta = \tan^{-1}\left\{\frac{\sqrt{(r+p)^2 - r^2}}{l}\right\}.$$

2. The sensor array system of claim 1, wherein said plurality of sensors comprises sensors capable of transmitting and receiving electromagnetic energy.

3. The sensor array system of claim 1, wherein said plurality of sensors comprises fiber optic light sensors.

4. The sensor array system of claim 1, wherein said circumferentially arranged plurality of sensors includes first and second groups of sensors, said first group of sensors having a more narrow field of view than said second group of sensors.

5. The sensor array system of claim 1, wherein at least one of said plurality of fields of view extends along the length of the curved surface in a direction that is substantially perpendicular to radius of the cylindrical object.

6. The sensor array system of claim 1, wherein said cylindrical object is a portion of a missile.

* * * * *